Patented July 5, 1932

1,865,586

UNITED STATES PATENT OFFICE

GRIGORI PETROFF, OF MOSCOW, UNION OF SOVIET SOCIALIST REPUBLICS

PROCESS FOR TREATING PRODUCTS OBTAINED FROM PLASTIC MASSES

No Drawing. Application filed April 23, 1927, Serial No. 186,186, and in the Union of Soviet Socialist Republics September 14, 1926.

The present invention relates to a process for the colouring and protection against atmospheric influences of various plastic, infusible and insoluble condensation products of phenols and aldehydes, obtained by pressing and moulding, or of these condensation products with various inorganic filling substances, such as for example bakelite, carbolite, resite or the like.

Hitherto these products have been coloured either by adding solid or dissolved colouring agents to the mass itself during production or a purely external colouring of the finished products has been obtained, for instance by spraying the same.

In the last method of colouring, a rough external layer is formed on the finished articles, this layer being readily detachable and preventing the articles from being mechanically treated externally.

On the other hand with the former method, the articles are coloured right through, but required far too large a quantity of the colouring matter. Moreover only a small number of the organic colouring agents can withstand unchanged all the phases in the formation of the hard plastic masses in the presence of phenol, formaldehyde and other constituents thereof.

For this reason, the colouring of bakelite products is restricted to two or three dull, ineffective shades, but for the most part such products either retain their natural colour or are coloured black with nigrosin in the manner referred to above. These few shades are however also very unstable and fade under the action of various atmospheric agencies, such as for instance light, air, moisture and the like.

It has been found from various observations, that under the action of the air, a darkly coloured, brittle layer rapidly forms on the surface of the insoluble, infusible, plastic products of the condensation of phenols with aldehydes, even when the primary materials are as pure as possible, this layer differing in its composition from the basic material and being probably an oxidation product of the latter.

This brittle surface layer prevents the plastic masses referred to from being used for electrical insulation purposes, as it is the cause of the surface of the insulator burning through at some points and being damaged in other ways.

In comparison therewith it is possible with the present process to impart to the plastic masses and products made therefrom, any desired colour of sufficient intensity by means of small quantities of organic colouring matter, as well as also to protect the same against the harmful effects of the atmosphere.

It has been found by experiments, that when the finished mass or the products made from the same are immersed in solutions of various substances in alcohols (methyl-, ethyl-, propyl-, isopropyl-, amyl alcohol or the like) or in lower ketones (acetone, methyl-, ethyl-ketone) aldehydes (acetaldehyde furfurol or the like), volatile organic acids (acetic acid, formic acid) or mixtures thereof, the plastic mass adsorbs the dissolved substances from the solvent, these substances penetrating into the mass to a greater or less extent according to the properties of the mass of the adsorbable substance and of the solvent, and also according to the concentration, the temperature and the duration of action of the solution.

It was noticed for instance that the adsorption takes place more rapidly and intensively from hot solutions, more especially boiling solutions than from cold.

When employing the present process for colouring the articles, use may be made of any desired organic colouring media which are soluble in the solvents referred to above and which are soluble or insoluble in water (so called spirit or grease colours).

In order to fix the colouring matter more satisfactorily and also to afford a better protection against atmospheric influences (oxidation) it is in many cases necessary to introduce into the solution, resins that arestable with respect to oxidation, such as for instance shellac, cellulose ether or the like, as well as also a definite quantity of hydroquinone, pyrogallol, gallic acid or the like high molecular phenols or aminophenols, tannin or other similar substances, all substances that are oxidation-preventing agents.

Resins and oxidation-preventing agents can be used either together or separately, and also without colouring matter, if the purpose of the treatment is not the colouring of the article but merely the protection of its surface against oxidation.

After the treatment in one of the ways described and the evaporation of the solvent (drying) the adsorbed substance (colouring matter, resin, oxidation-preventing agent) is satisfactorily fixed in the mass to a greater or less extent.

In the cases in which the colouring is effected by means of a colouring material soluble in water, it is advisable, after the treatment with alcohol or the like, to fix the colour by boiling in aqueous solutions of suitable mineral salts, for instance bichromates, alum, Glauber's salt, ferric-, copper- or other salts, which are usually employed as fixing agents in ordinary dyeing.

As many of such substances are also effective as oxidation-preventing agents (for instance tannin) the colouring and the protection against oxidation may be divided into two operations or on the contrary, both operations may be combined.

It may also be pointed out that the fixing of some colouring agents according to the present process differs from the usual fixing process of dyestuffs, for instance on textile fabric. For instance it has been found that the treatment of an article coloured with the basic dyestuff (for instance malachite green) by means of a bichromate solution fixes the basic dyestuff completely in the mass without changing its colour or only changes it to a very slight extent.

The articles treated in the above manner and obtained from the condensation products of phenols and aldehydes are of good appearance and can be lacquered and polished.

The organic dyestuffs and other protecting agents of the plastic mass according to the present invention are permanently effective against the detrimental effect of light, air and other atmospheric agencies.

*Example 1*

An alcoholic solution of 2% of the same dyestuff and of 2% shellac is heated, and the article to be treated is kept in the hot solution for 2 hours.

*Example 2*

The article is introduced into the alcoholic solution of 1% greenish spirit brown and 0.5% hydroquinone and boiled for one hour.

Having now particularly described and ascertained the nature of my said invention and in what manner the same is to be performed, I declare that what I claim is:—

1. The process of treating hard, infusible, insoluble phenol-aldehyde condensation products to improve the same which comprises subjecting the products to the action of a solution comprising a coloring matter and resins dissolved in a volatile organic solvent chosen from the group consisting of alcohols, aldehydes, lower ketones and volatile organic acids.

2. The process of treating hard, infusible, insoluble phenol-aldehyde condensation products to improve the same which comprises subjecting the products to the action of a solution comprising a coloring matter, resins and oxidation-preventing compounds, dissolved in a volatile organic solvent chosen from the group consisting of alcohols, aldehydes, lower ketones and volatile organic acids.

In testimony whereof I have signed my name to this specification.

GRIGORI PETROFF.